United States Patent [19]

Menon

[11] Patent Number: 5,301,304
[45] Date of Patent: Apr. 5, 1994

[54] EMULATING RECORDS IN ONE RECORD FORMAT IN ANOTHER RECORD FORMAT

[75] Inventor: Moothedath J. Menon, San Jose, Calif.

[73] Assignee: International Business Machines Corporation, Armonk, N.Y.

[21] Appl. No.: 914,485

[22] Filed: Jul. 15, 1992

Related U.S. Application Data

[63] Continuation of Ser. No. 686,490, Apr. 15, 1991, abandoned, which is a continuation of Ser. No. 197,057, May 20, 1988, abandoned.

[51] Int. Cl.⁵ .............................................. G06F 13/00
[52] U.S. Cl. ...................................................... 395/500
[58] Field of Search ...................................... 360/45-52

[56] References Cited

U.S. PATENT DOCUMENTS

| | | | |
|---|---|---|---|
| 4,054,947 | 10/1977 | Shanks et al. | 364/900 |
| 4,223,390 | 9/1980 | Bowers et al. | 364/900 |
| 4,262,332 | 4/1981 | Bass et al. | 364/200 |
| 4,393,445 | 7/1983 | Milligan et al. | 364/200 |
| 4,416,558 | 11/1983 | McInroy et al. | 400/279 |
| 4,435,762 | 3/1984 | Milligan et al. | 364/200 |
| 4,467,411 | 8/1984 | Fry et al. | 364/200 |
| 4,481,603 | 11/1984 | McCaskill et al. | 364/900 |
| 4,527,273 | 7/1985 | Hibi et al. | 371/38 |
| 4,680,653 | 7/1987 | Ng et al. | 360/72.2 |
| 4,745,604 | 5/1988 | Patel et al. | 371/38 |
| 4,775,969 | 10/1988 | Osterlund | 369/53 |
| 4,939,598 | 7/1990 | Kulakowski et al. | 360/48 |
| 4,947,367 | 8/1990 | Chang et al. | 364/900 |
| 4,947,367 | 8/1990 | Chang et al. | 364/900 |

OTHER PUBLICATIONS

IBM Technical Disclosure Bulletin, Ouchi, "System for blocking variable length records" vol. 16 #4 pp. 1239-1240 Sep. 1973.
GA 33-1528-2 pp. 1-1, 1-4, 1-5, 2-1 & 2-2 Dated Sep. 1982.

*Primary Examiner*—Dale M. Shaw
*Assistant Examiner*—C. Shin
*Attorney, Agent, or Firm*—Henry E. Otto, Jr.

[57] ABSTRACT

Count, key, data (CKD) datas are stored on fixed block (FBA) disk recorders (DASD). A virtual track is created which emulates a physical CKD track such that the byte displacement of each CKD record on the virtual CKD track is the same as the byte displacement would be on a physical CKD track. This enables computer programs using CKD formatted data to record on the FBA recorder in an emulation mode. Each FBA block includes a header outside the addressing of the virtual CKD track which includes a byte displacement pointer to the beginning of a first CKD record stored in the FBA block, if any begins in such FBA block; otherwise the header indicates that no CKD record begins in the block. A last record indicator is included in the count field emula-tion for assisting in finding end of the virtual track.

6 Claims, 3 Drawing Sheets

EMULATING RECORDS IN ONE RECORD FORMAT IN ANOTHER RECORD FORMAT

This is a continuation of application Ser. No. 07/686,490 filed Apr. 15, 1991, abandoned, which is a continuation of application Ser. No. 07/197,057 filed May 20, 1988, abandoned.

FIELD OF THE INVENTION

This invention relates to recording operations of an information handling system, more particularly to recording data arranged in a first format on a recording device that is formatted in a second format incompatible with the first format.

BACKGROUND OF THE INVENTION

Information handling systems have used diverse formats for recording data on peripheral data recorders. When a given data recording format has been selected, the programming of the information handling system is designed to operate with the selected format. This limitation means that data recorders have to use the format contemplated in the programming, and vice versa. Some emulation of one recording format on another recording format has been achieved; such emulation has not enabled the programming to easily address the emulated format. That is, emulation software had to translate the addresses of the first format into different addresses of the second format. Such address translation not only obscures the record addresses of the first format when recorded over the second format but also can require substantial buffering and instruction execution resources.

Marilyn Bohl in INTRODUCTION TO IBM DIRECT ACCESS STORAGE DEVICES, publication SR20-4738, Science Research Associates, Inc. Chicago, Ill., in Chapter 4 describes two data formats. The first is the well known count, key, data (CKD) format used on International Business Machines Co. (IBM) disk recorders, also termed disk files and DASDs. Many large scale information handling systems employ CKD data format in their programming and recording. Bohl also describes fixed block (FB) recording, also termed fixed block architecture (FBA) format.

The CKD format enables efficient usage of disk space for large records by dividing disk track recording format in accordance with record size, whereas the FBA format uses a set of identically-sized addressable areas (termed blocks), each of which can store up to some fixed amount of data, such as 512 bytes, 1024 bytes, 2048 bytes, etc. For small record sizes (such as less than 512 bytes) FBA may have some advantages over CKD. In any event, information handling systems are employed which have DASDs some of which use CKD while others use FBA formats. Many of the programs executed in the systems are designed to work with CKD format; therefore it is desired to enable CKD formatted data to be recorded on record disks or members in FBA devices. It is also desired to maintain the CKD record addressability for all data records stored in FBA formats.

DISCUSSION OF THE PRIOR ART

Prior recording of CKD formatted data on FBA devices is described generally in the IBM publication GA33-1528-2, Third Edition, September, 1982, entitled "IBM 4321/4331 Processors Compatibility Features" in pages 1—1 through 1-5 and 2-1 through 2-3. In this format superposed recording (not true emulation), CKD formatted data as found on IBM 2311 and 2314 DASD volumes were recorded onto an IBM 3310 FBA recorder. This publication teaches that all gaps (non data containing areas interposed between various fields of the data format when recorded onto DASD) are removed for compacting the CKD formatted data onto the FBA recorder. This action obscures the CKD addressability of records in the CKD format. Entire tracks of CKD recorders (even though the track is not filled with data) are recorded onto FBA recorders. Mapping of the format-superposed recording is shown on page 2-3 of the publication. It is desired to provide a true emulation of CKD format upon FBA formatted recorders by maintaining CKD rotational addressability of CKD records stored in the FBA recorder.

SUMMARY OF THE INVENTION

It is an object of this invention to reformat first formatted data records onto a second incompatible record format while maintaining the byte displacement relative position of the records of the first format in the second format.

It is another object of this invention to provide addressing data of the first format when recorded in a second incompatible format by adding control information to the second format while maintaining the byte displacement address of the records to be the same in both formats wherein the addressing in the second format uses a virtual track concept.

In accordance with the invention, data in a first format which includes a control field (such as count and key fields in CKD formatted data) and a data field in each addressable record is modified to be stored as data in a second incompatible format while maintaining byte displacement addressability of the records of the first format when modified to be stored in the second format. Such modification creates an emulation of the first format into the second format by maintaining inter-record gaps in both formats while deleting intra-record gaps, error detection redundancies, physical parameter data, padding unique to the first format, during the modification. The data arrangement in the second format is independent of the first format such that records are split between addressable portions of the second format.

Control information is added to each of the addressable portions of the second format relating to one control field of one record stored in the addressable portion. The length of data in the first format is completely variable enabling a minimal number of the addressable portions to be consumed in storing the modified first formatted data in the second format.

In a specific aspect of the invention, one or more DASD tracks of CKD formatted data is emulated on an FBA format as a virtual track wherein blocks of the FBA format are the addressable portions of the second format. This aspect includes emulating virtual CKD disks consisting of many virtual tracks of data.

The foregoing and other objects, features, and advantages of the invention will be apparent from the following more particular description of preferred embodiments of the invention, as illustrated in the accompanying drawings.

DETAILED DESCRIPTION

Figure 1:
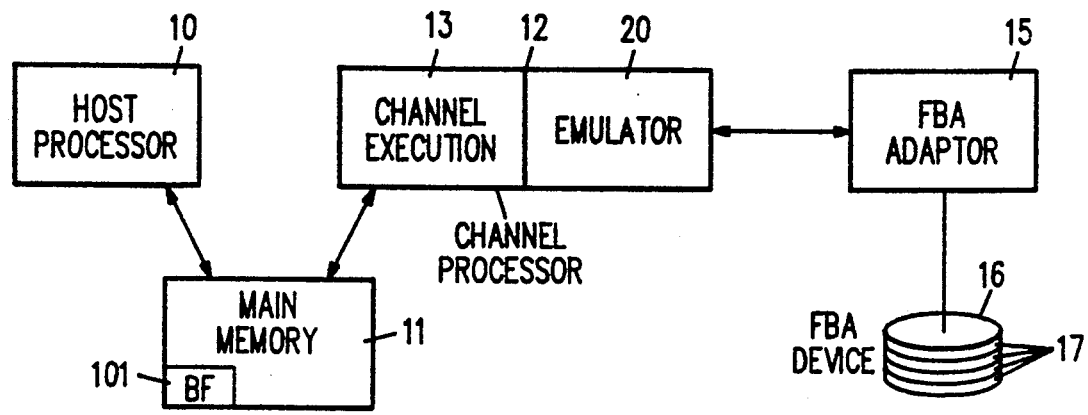
FIG. 1 is a simplified showing of an information handling system in which the present invention may be advantageously practiced.

Referring now more particularly to the drawing, like numbers and characters denote like parts and structural features shown in the various figures. An information handling system which advantageously employs this invention is shown as including a host processor 10 effecting programs out of main memory 11. Usual procedures are employed for paging the programs from peripheral program storage(not shown) to main memory 11. Channel processor 12 (which is usually packaged in the same cabinet as host processor 10) executes channel programs stored in main memory 11 for executing desired input-output machine operations for host processor 10. Such channel programs are respective lists of channel control words (CCW's) as practiced in the so-called 370 architecture computers manufactured by IBM. Such usual channel program execution is represented by the channel execution portion 13 of channel processor 12. Channel processor 12 is connected via the usual cabling to the FBA adaptor 15 which in turn is connected to FBA device or DASD 16. Storing and retrieval of data in and from DASD 16 using FBA format follows the known peripheral data storage techniques. DASD 16 includes a plurality of co-rotating disks 17 each of which have one or two recording surfaces with a large plurality of addressable record tracks arranged in cylinders, as is well known.

Since many of the programs executed by host processor 10 employ the well known CKD data format, such CKD formatted data cannot be directly recorded in DASD 16—a CKD formatted DASD would normally be used. To make the programs of host processor 10 operate with the DASD 16 FBA format, emulator 20 is interposed between channel execution 13 and FBA adaptor 15 for emulating CKD formatted data in FBA format. Emulator 20 can be logic circuits in the form of semiconductor chips, programming either in ROM form, diskette form or paged into channel processor 12 from peripheral program storage. Such emulator may be lodged in main memory 11 for execution by the circuits of channel processor 12 or be in a separate program memory of channel processor 12.

CKD data are stored in FBA DASD 16 as a virtual track of data. The CKD data may be one or more CKD tracks of data. The number of bytes in the virtual track is not dependent on any physical track size in any CKD device or FBA device, rather it is the size of the CKD formatted data that determines the size of the virtual track. The number of bytes in the CKD data is known or can be easily calculated, see Bohl, supra.

The following description assumes that a DASD 16 disk 17 has been formatted to receive CKD formatted data. See the flow chart entitled "Steps to Initialize an FBA Disk for CKD Emulation", infra. A first step in creating the emulation is to calculate the number of blocks of DASD 16 track(s) that are needed to store the data. Let X be the number of bytes in the CKD data and BPB be the number of bytes storable in one addressable block of DASD 16. Further, it is desired to record a control information header HD in each of the blocks for facilitating direct access to any CKD record in the emulated or virtual track. Let CID be the number of bytes to be used for the header. Then B blocks of FBA format (B is (X/(BPB-CID)) rounded to the next higher integer). B blocks of FBA DASD 16 are allocated to store the CKD data. Such allocation follows usual procedures. It matters not whether one or more FBA tracks are employed, whether or not the allocation is fragmented with the fragments being link listed together (fragmentation reduces performance) and whether or not the allocation begins at an index or end of track (EOT) of DASD 16.

Figure 2:
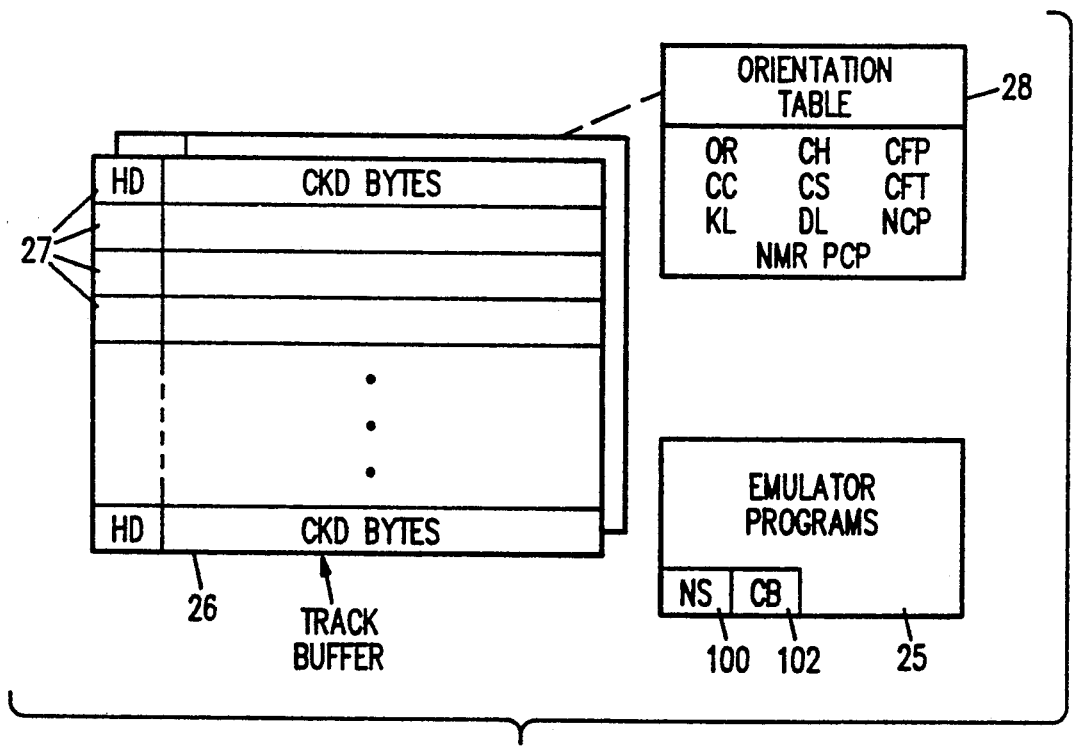
FIG. 2 is a diagrammatic showing of practicing the invention in the FIG. 1 illustrated information handling system.
Figure 3:
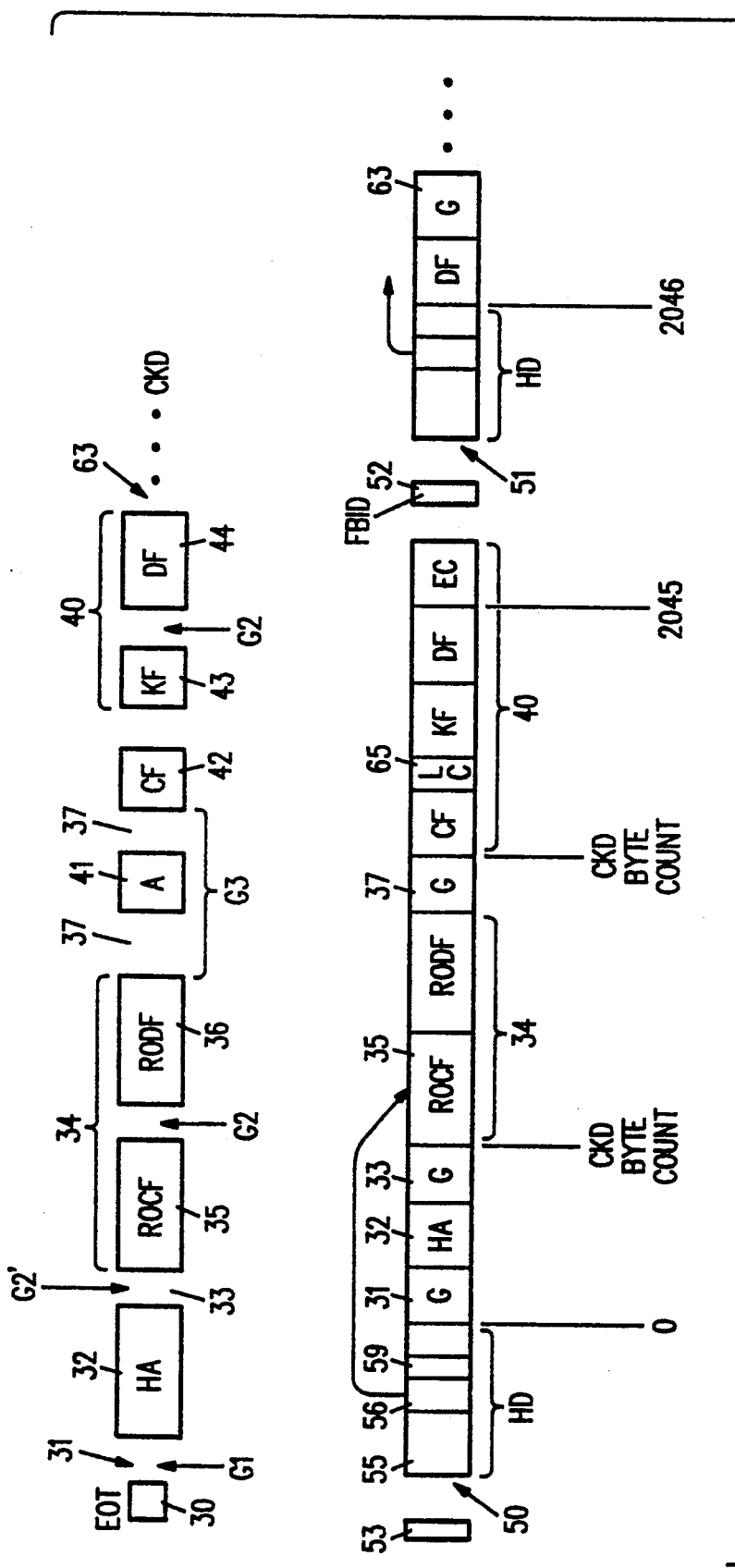
FIG. 3 is a diagrammatic showing of first and second data formats and the emulation of the first data format in the second data format as practiced in the FIG. 2 showing.

The modification of the CKD data is best generally understood by reference to FIG. 2 which shows the flow of the modification and FIG. 3 which shows the formatting of the emulation. For purposes of this description, emulator 20 is implemented as a set of programs 25 executable in channel processor 12. These channel programs are flow charted in the latter portion of this description. The invention is also easily practiced by incorporating programs constructed in accordance with the invention in a peripheral subsystem control unit, such as FBA adaptor 15.

A virtual track buffer 26 is allocated as a part of main memory 11; in newer larger host processsors, channel processor 12 has its own memory, in that instance buffer 26 is allocated as a part of the channel processor 12 memory. Each entry area 27 has a storage capacity equal to the storage capacity of an FBA block. The leftmost two bytes of each entry store the later-described control information header HD and the remaining bytes of each buffer entry store the FBA formatted CKD data, a byte of CKD data immediately adjacent a header HD 27 is termed a first byte of such CKD data in each of the addressable units. HD is recorded in each FBA block in byte positions 0 and 1. CKD data is recorded in each FBA block beginning with byte position 2. Emulator 20 programs 25 process the CKD data to fit into the buffer 26 entries as shown in FIG. 3. The emulation is completed by emulator programs 25 doing a virtual rotational orientation of the virtual track using orientation table 28. This virtual orientation relates to the data stored in buffer 26. Once the CKD data is emulated on the FBA format within buffer 26, the buffer 26 contents flow through FBA adaptor 15 to DASD 16 for recording in the allocated FBA blocks. In a constructed embodiment, the contents of the allocated and emulator 20 formatted FBA blocks are read first from DASD 16 into buffer 26, whether or not such blocks contain any CKD data.

FIG. 3 shows the CKD and FBA formats with the CKD data being stored in true emulation in the FBA blocks. The CKD data format includes an end of track (EOT) indicator 30 (in a CKD DASD, EOT is the index). In the virtual track, EOT designates the beginning and end of the track, i.e. logically the virtual track is circular. Inter-record gap G1 at location 31 separates EOT from the first or reference record HA 32 always found in a CKD track. A second inter-record gap G2' 33 separates HA 32 from the record R0 34. R0 record 34 includes the control information field R0 count field (R0CF) 35 and the R0 data field R0DF 36. Third inter-record gap G3 37 separates record R0 34 from the first data record R1 40. Physical address mark A 41 is interposed between successive records within gap G3 in a CKD physical track. The CKD physical address information A is deleted from the emulation. CKD record 1 includes count field CF 42, key field KF 43 and data field DF 44. CF 43 is an optional field. The control information in record R1 40 is contained in CF 42 and KF 43. All subsequent records R2, et seq, in the CKD data use the illustrated well known format.

The FBA formatted track as it stores the CKD data for emulation is illustrated as FBA block 50 followed by FBA block 51. Block 50 is shown as storing the first portion of the CKD data. Block 50 can be at any circumferential location in the FBA track. FBID (fixed block physical identification) 52 is intermediate FBA blocks 50 and 51. FBID 52 stores the track address and the block address of the ensuing block. FBI 53 physically identifies block 50 location on the FBA disk. This FBA physical identification replaces the CKD physical identification used with the CKD format on DASD. Such substitution allows recovery processes which employ physical DASD locations. As will become apparent the CKD record address in byte displacement from the beginning of the data has a predetermined known relationship to the FBA physical address allowing directly and randomly addressing any of the CKD records as stored on the FBA formatted disk.

FBA block 50 illustrates the packing of the CKD formatted data for maintaining CKD byte displacement addressing of the CKD records. Note that the CKD byte displacement addressing on a CKD formatted disk is the rotational position of the record on the CKD track. True emulation requires that this same byte displacement occur in the virtual track as such track is realized physically in an FBA formatted disk. Block 50 has its first two bytes 0 and 1 occupied by the control header HD 55. Each control header HD 55 includes a byte displacement pointer 56 which points to the first byte of the first occurring count field stored in the instant FBA block. In FBA block 50 pointer 56 points to the first or initial byte of R0CF, the record R0 34 count field 35. If a given FBA block is storing no CKD count field, then the pointer is null and an indicator bit 59 is set to indicate no record begins (no count field) in the instant FBA block. Other control information beyond the present description may also be included in control header HD 55. Beginning at byte 2 (3 bytes displaced from the beginning of the FBA block), is gap G1 31. This inter-record gap has a correct number of gap indicating bytes (zeros, for example) so that the first byte of record HA 32 begins at the same byte displacement within FBA block 50 as HA 32 is displaced from EOT 30 in the CKD format. CKD inter-record gap 33 is similarly replicated in FBA block 50 between HA 32 and record R0 34 such that the first byte of R0CF 35 has the same displacement from byte 2 of FBA block 50 (beginning of the virtual CKD track) as it does from EOT in the CKD format. All succeeding inter-record gaps 37 and 63 are similarly sized to achieve the byte displacement of the first byte of each CKD count field from the beginning of the CKD track and also from the beginning of the virtual track. Since the actual numerical computation is readily apparent from the two formats as described by Bohl, supra, the computation is omitted for purposes of brevity.

The physical relationship of the virtual track to the FBA blocks is relatively simple. Each FBA block is shown as capable of storing 2048 bytes. Since two bytes are used for HD 55, each FBA block stores 2046 bytes of the virtual track. FBA block 50 stores bytes 0 through 2045 while the next adjacent FBA block 52 stores bytes 2046 through 4091 the third FBA block (not shown) stores bytes 4092 through 6137, etc for all succeeding FBA blocks (not shown) storing the CKD data as a virtual CKD track. The last FBA block in the allocated set of B (B is an integer) FBA blocks will probably not be completely used by the virtual track. In such instance, padding bytes fill the unused portion of the last allocated FBA block.

Much of the control information found in the CKD track is deleted and not recorded in the virtual CKD track of the physical FBA blocks. Each FBA block typically has its own error detection and correction (ECC) redundancy, its own padding bytes, its own physical parameter indications (such as defect information) and the like. The related DASD physical parameters found in the control portions of CKD recordings are deleted, all that are retained are those parameters necessary for logically defining the virtual track in sufficient precision to enable accessing records using the CKD byte address. The CKD count field is reduced from 28 bytes to 12 bytes. The retained 12 bytes contain CCHH (cylinder head address), R (record number), KL (key length in bytes), and DL (data length in bytes). In addition, to identify the last record in the virtual track, emulator 20 adds one bit to the count field CF emulation. The one added bit LC 65, when set to 1, indicates that the count field is the last count field of the virtual CKD track. As records are added to the virtual track, the LC bit 65 that is set to unity is moved to the last added record. All other LC bits 65 are reset to zero. An LC bit 65 is also included in R0CF 35.

Orientation table in buffer 26 indicates the virtual rotational CKD byte displacement information enabling CKD related programs to readily address and transfer data within buffer 26. Table 28 contains several entries as listed below:

TABLE 28

| EMULATOR ORIENTATION | |
|---|---|
| OR | oriented bit (logical or virtual orientation) |
| CC | current cylinder address |
| CH | current head address |
| CS | current sector address |
| CFP | current field pointer |
| CFT | current field type (count, key or data) |
| NCP | next count field pointer |
| PCP | previous count field pointer |
| DL | CKD data field length in bytes |
| KL | key field length in bytes |
| NMR | no more records bit |

Figure 4:
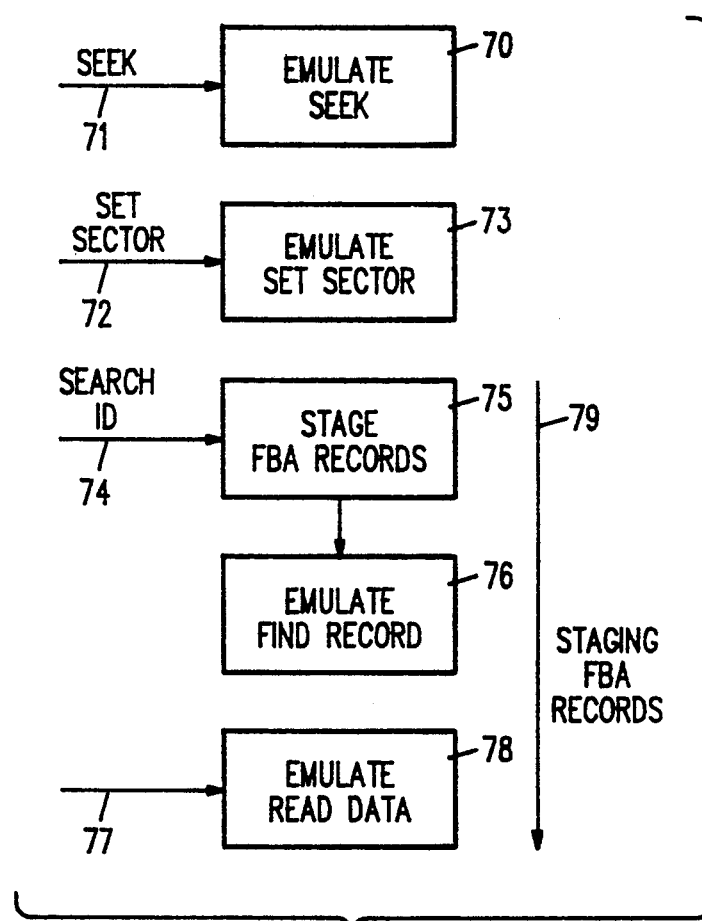
FIG. 4 is a simplified flow chart of machine operations employed in the FIG. 2 showing.

Emulator 20 uses table 28 to logically emulate seeks and other DASD physical activity related to accessing CKD data on an actual CKD DASD. FIG. 4 is a simplified flow chart showing emulation activity related to data area accessing CKD data recorded and emulated on FBA DASD. A first operation in any DASD is to seek to the addressed track. Hence emulate seek step 70 (see textual flow chart "Execution of Seek Command") is performed in response to a SEEK channel command received from channel execution 13. Emulator 20 updates table 28 to reflect the CC and CH parameters passed with the SEEK command. Channel execution 13 generates the SEEK command from a SEEK CCW, as is known. A second step 73 is to obtain rotational orientation (OR=0 above since there has been no rotational—byte displacement identification—orientation). A SET SECTOR channel command indicated by arrow 72 causes emulator 20 to emulate the SET SECTOR operations of a CKD device (see textual flow chart "Execution of Set Sector Command). This command merely identifies the rotational position (byte displacement) at which an ensuing data transfer command will be addressed. The OR bit of orientation table 28 is still zero. At this time no data has been moved from DASD 16 to buffer 26. When a SEARCH ID channel command is issued by channel execution at arrow 74, then host processor 10 is saying it wants data to be transferred. At this point in the sequence, emulator 20 accesses DASD 16 to stage data from DASD 16 to buffer 26 as indicated at step 75. Note that the ID portion of SEARCH ID gives identification in CKD address parameters; these parameters are not translated to independent addresses except for identifying which FBA block is storing the CKD count field CF related to the SEARCH ID command. This computation is simple, therefore no numerical examples are given.

As soon as FBA blocks are stored in buffer 26, emulator 20 accesses the buffer 26 in step 76 to emulate finding a CKD record on a CKD DASD. Once the desired record is found in buffer 26, a DE (device end) is sent to host processor 10 indicating orientation has occurred. The OR bit of orientation table 28 is set to unity.

Host processor 10 issues a data transfer command indicated by arrow 77 causing emulator 20 to emulate in step 78 a CKD readout at from DASD by transferring data between buffer 26 and main memory 11. During such a data transfer, emulator 20 continues to stage FBA blocks from DASD 16 into buffer 26 simulating disk rotation in the buffer. Usually, a host processor reads or writes a large plurality of records beginning with a first addressed record. This activity continues until the end of the virtual track (end of the CKD data) irrespective of the index marks related to FBA operations with DASD 16, a received channel command indicates that the data transfer is stopping or an end of the channel operation is indicated. This continued staging independent of the host processor accesses is indicated by arrow 79.

Below are textual flow charts showing the details of the above described operations. The Glossary following the flow charts indicate the meaning of abbreviations used. Any programming language or logic hardware may be used to implement these flow charts. In a practical embodiment, other channel command execution commands in addition to what are illustrated may be used to complete a machine.

FLOW CHARTS SHOWING PROGRAMS 25 OF EMULATOR 20

The textual flow charts below show the machine steps in channel processor 12 which illustrate the invention; these steps do not describe a complete machine design as such other programs and structures found in a complete machine are not necessary to practice the present invention.

FLOW CHARTS OF CHANNEL COMMAND EXECUTION

Including Called Subroutines

EXECUTION OF SEEK COMMAND

Validate received command
Verify that filemask allows seeks
Read seek parameters from received command, verify format
Validate cylinder (CC) and head (HH) addresses
IF seek needed (current CCHH does not equal requested CCHH), then continue, else go to step labelled "CEDE to channel"
Save CCHH and apply same to seek circuits
Set "need to seek" bit 100 NS=1
Set "oriented bit" to OR=0
CEDE to channel; check chaining and proceed

EXECUTION OF SET FILE MASK COMMAND

Validate received command
Read filemask parameters from received command
Save filemask
Set "oriented bit" to OR=0
CEDE to channel; check chaining and proceed

EXECUTION OF SET SECTOR COMMAND

Validate received command
Read parameters from received command
Validate sector number of command and save it as S
Set "oriented" bit OR=0
CEDE to channel; check for chaining and continue.

EXECUTION OF SEARCH ID COMMAND

Validate received command
IF OR=0, call GET ORIENTED subroutine
Read parameters from received command

DO ONE OF FIVE CASES

IF CFT=CNT, then do CASE I, else
IF CFT=R0CNT, then do CASE II, else
IF ID points to a non-count field of a record other than last record OR if ID points to HA and R0 exists, do CASE III, else
IF (oriented beyond last record OR to non-count field of last record) AND not a multi-track operation, do CASE IV, else
IF (oriented beyond last record OR to non-count field of last record) AND multi-track operation is being performed, do CASE V

END OF FIVE CASES

Set SIZE=number of bytes of received parameters
Compare SIZE, starting at PTR with parameters
Send results to channel, successful or unsuccessful compare; if SIZE<5, on successful compare, save as SIZE 5.
Do ending status

STEPS OF CASE I

PTR=CFP
CFP=CFP+12
IF KL=0; then CFT=DF, else CFT=KF

STEPS OF CASE II

PTR=CFP
CFP=CFP+12
IF KL=0, then CFT=R0DF, else CFT=R0KF

STEPS OF CASE III

PTR=NCP
KL=key length of record at pointer PTR
DL=data length of record at pointer PTR
IF CFT=HA field, then PCP=CFP, else PCP=next count (calculate next count pointer)
CFP=PTR+12
IF KL=0, then CFT=DF; else CFT=KF
NCP=calculate next count pointer(call subroutine)
IF LC=1, then NMR=true (1), ELSE NMR=false (0)

STEPS OF CASE IV

IF EOT (index passed)=1, then ERROR; else EOT=1 (index passed
BB=(T*C+H)*B
BBLAST=(T*C+H)*B+(BPS*S/BBB)−1  (see Glossary for BBB)
Set S to be >G1/BPS and <(G1+G2'+SIZE(HA)+- PADH+ECCH))/BPS
Call GET ORIENTED at step 4
IF GET ORIENTED=0, then indicate no record found, else record found
PTR=CFP
CFP=CFP+12
if KL=0, then CFT=R0DF, else CFT=R0KF

STEPS OF CASE V

Set H=H+1, IF new H>T, signal error
Set S>(G1/BPS) but <(G1+G2'+SIZE(HA)+- PADH+ECCH)/BPS
Call GET ORIENTED beginning at step 2
IF no record found, return to Set S, else continue
PTR=CFP
CFP=CFP+12
IF KL=0, then CFT=R0DF, else CFT=R0KF

EXECUTION OF READ DATA COMMAND

Validate received command
IF previous CMD was SEARCH that compared equal; PO=1
IF OR=0, call GET ORIENTED
IF oriented to non R0 record OR (oriented to R0 and PO=1, then do CASE A, else
IF oriented to R0 AND (previous CMD was not SEARCH ID nor
SEARCH KEY and R1 is present, do CASE B, else
IF oriented to HA AND R0 and R1 are present, then do CASE C,
IF EOT=1 and not a multi-track operation, then do CASE D, else
IF EOT=1 and it is a multi-track operation, then do CASE E

END CASES

Read number of bytes L from location PTR
IF L=0, UC to channel with CEDE, else CEDE to channel

STEPS OF CASE A

PTR=CFP
IF CFT=KF OR R0KF, then PTR=PTR+KL, else
IF CFT=CNT or R0CF, then PTR=PTR+12+KL
DO STEPS Y

STEPS Y

L=DL
CFP=NCP
PCP=calculate next CNT from PCP
IF NMR=1, then CFT=index (EOT), else DO
  DO LOOP
  CFT=CNT
  KL=KL of CFP
  DL=DL of CFP
  NCP=calculate from CNT of CFP
  IF LC=1, then NMR=1, else NMR=0

STEPS OF CASE B

CFP=NCP
L=DL of CFP
PTR=CFP+12+KL
PCP=CFP
CFP=calculate next CNT from CNT of CFP
DO STEPS X

STEPS X

IF LC=1 for PCP, then CFT=EOT, else DO
  DO LOOP
  CFT=CNT
  KL=KL of CFP
  DL=DL of CFP
  NCP=calculate next CNT from CFP
  IF LC=1, then NMR=1, else NMR=0
END DO

STEPS OF CASE C

PTR=calculate next CNT from NCP
L=DL of PTR
CFP=PTR
PTR=PTR+12+KL
PCP=CFP
DO STEPS X

STEPS OF CASE D

IF EOT=1, set ERROR, else set EOT=1
BB=(T*C+H)* B
BBLAST=(T*C+H)* B+(BPS*S/BBB)−1 (BBB— see Glossary)
Set S>(G1+G2'+SIZE(HA)+PADH+ECCH)/BPS
Set S<(G1+G2'+SIZE(HA)+PADH+ECCH+G2+G3+SIZE(CF)+PADC+ECCC+8+ECCD)/BPS
Call GET ORIENTED, start at step 4
IF OR=0, no record found, else record found
PTR=CFP+KL+12
DO STEPS Y

STEPS OF CASE E

Set H=H+1, IF new H>T, set ERROR
Set S>(G1+G2'+SIZE(HA)+PADH+ECCH)/BPS
Set S<(G1+G2'+SIZE(HA)+PADH+ECCH+G2+G3+SIZE(CF)+PADC+ECCC+8+PADD+ECCD)/BPS
Call GET ORIENTED, start from step 2
IF NRF=1, (no record is found), return to first step of CASE E, else continue
PTR=CFP+KL+12
DO STEPS Y

END OF CASES A THROUGH E

Send L bytes to channel, starting from PTR
IF L=0, CEDE UC to channel, else CEDE to channel

EXECUTION OF WRITE DATA COMMAND

Validate received command
CKD data is received from host processor and stored in a separate buffer area of main memory 11, the following steps operate on the stored CKD data after it is converted as shown in FIG. 3.
PTR=CFP
IF CFT=KF or R0KF, then PTR=PTR+KL
DO STEPS Y
Store L bytes of CKD data from host in buffer 26 at PTR.
Write updated or new FBA blocks (such as 50 and 51) into DASD 16.
Upon writing all FBA blocks to DASD 16, send CEDE to the channel. Proceed to other operations.

GET ORIENTED SUBROUTINE

This subroutine manages orientation table 28.
IF no SEEK command this chain of commands, CC=CH=0
IF no SET Sector command this chain of commands CS=0

STEP 2

Identify the first FBA block to be staged to buffer 26, i.e. which stores the first record to be transferred.
first FBA block address=(T*C+H)*B+(BPS*CS/BBB) rounded to next lower integer
Identify last FBA block to be staged to buffer 26 from DASD 16.
last FBA block address=(T*C+H)*B+(B−1)

STEP 4

Read FBA blocks identified above and all intermediate FBA blocks into buffer 26 as shown in FIG. 2. Keep HD's separate from data in FBA blocks (bytes 2-2046)
Examine HD of first FBA block;
 IF no pointer to a CF in the FBA block, examine HD's succeeding FBA blocks until the first count field is located.
 IF EOT is reached without a count field, then stage FBA blocks from beginning of the virtual track to the first FBA block to find a count field, if no count field is found, signal UC to channel.
Set FBA block NR (block having first count field)=first FBA block−(T*C+H)*B
Set Z=(NR*BBB)+offset pointer from HD (number of bytes the first byte of the first count field is inside the FBA block NR
IF BPS*S <Z, then orientation is to HA or a count field beyond sector S, skip to "step 9), else continue
IF LC=0, then:
 Set Z'=Z+12+KL+DL+PADC+ECCC+PADD+ECCD+G2+G3
 IF KL is not zero, then Z=Z'+PADK+ECCK+G2, else Z=Z'
 (Above assumes search is between first record and EOT)

STEP 9

Set NS=0 (no need to seek)
Update orientation table 28
 CFP=Z
 KL=KL in count field of record
 DL=DL in count field of record
 CC=cylinder address in count field of record
 CH=head address in count field of record
 CFT=IF S*BPS<G1, to HA; else IF G1<S*BPS<G1+G2'+SIZE(HA)+PADH+ECCH, to R0 count field R0CF, else CF of data record "n".
 OR=1
IF LC=1, then set NMR=1, else NMR=0
Return to caller

CALCULATE NEXT COUNT FIELD POINTER SUBROUTINE

Pointer PTR2 points to next count field location in the emulated virtual track.
IF PTR=G1, then PTR2=PTR+12+PADH+ECCH+G2'else PTR2=PTR+12+KL(record pointed to by PTR)+DL(record pointed to by PTR)+PADC+ECCC+PADD+ECCD+G2+G3
IF KL(of record pointed to by PTR)=0; then PTR2=PTR2+G2+PADK+ECCK
Return PTR2 to caller

PROGRAMS FOR INITIALIZING FBA DISK FOR EMULATION

NUMBER OF FBA BLOCKS FOR CKD DISK

Let X=number of bytes in a CKD track
Let B=X/BBB (number of blocks used for each CKD track,)
Number of tracks per CKD device is product of number of cylinders times the number of tracks per cylinder. Number of blocks for each CKD device is the product of B times the number of tracks in the CKD device.

STEPS TO INITIALIZE AN FBA DISK FOR CKD EMULATION

Let CYL=the number of cylinders of emulated CKD device
First initialize all FBA blocks on FBA disk to be used for emulation to store the hexidecimal pattern 0008 in bytes 0 and 1 of each FBA block to be used. In addition, every Bth block contains a logical HA and R0 record. This inclusion is described below.
DO for all of the FBA blocks to be initialized with HA and R0:
Set buffer 26 to one FBA block which will be repeatedly used.
In bytes 0 and 1 store G1 in first 12 bits and all 0's in last 4 bits.
At byte offset of G1+2 in the respective blocks, write HA with zero's in flag byte, CC=cylinder number incremented from 0 to CYL−1; HH=track number incremented from zero to T−1, R byte (record number)=zero; KL=0; DL=0, LC=0 and pad bytes=0's
At byte offset in the respective blocks of G1+G1'+2(HA) +ECCH+PADH create R0 as above for HA except that DL=8 and LC is all ones.
Write block from current buffer to FBA disk at appropriate blocks separated by B −1 blocks on the FBA disk.

STEPS FOR WRITING CKD TRACK INTO B FBA BLOCKS

This flow chart relates to copying data from a CKD track to the B FBA blocks on the FBA disk.

Make buffer 26 with B buffer entries (number 0 through B−1)

Set B flag bits BF 101 in main memory initialized to 0 (false); when for a given FBA block (buffer 26 entry), its flag BF=1, then control information has been recorded for the FBA block related to the flag bit. In buffer 26 store the binary pattern 00001000 in the second byte of all respective HD's. This pattern indicates no data has been recorded in the represented FBA block.

CB 102 points to the next byte to be written into buffer 26 entry. Minimum value is 2 (jump over HD bytes 0 and 1).

The CKD track has been copied as a CKD track in main memory 11 having fields HA, R0CF, R0DF, CF1, KF1, DF1, etc.

Memory pointers are all zeros.

The count fields have only 12 bytes rather than 28—CKD physical parameters etc have been deleted.

Each time Write is called, bytes are written starting from CB, the HD bytes are always skipped. If a count field is being written and its corresponding flag BF is off, its flag BF is set on. The corresponding HD is made to contain an offset to the written count field. CB is always updated.

STEPS of writing CKD into a buffer entry.

CB=2
Write G1 zero bytes (update CB each byte recorded)
Write HA
Write G2'+Size(HA)−12+PADH+ECCH of zero bytes
Write R0CF
Write R0DF
Write G2+G3+Size(CNT)−12+PADC+ECCC+PADD+ECCD of zero bytes.
Repeat for each CKD record other than record R0:
  Write CF
  Write KF
  Write DF
  Write G1+G2+G3+Size(CNT)−12+PADC+ECCC+PADK+ECCK+PADD+ECCD of zero bytes.
Write buffer 26 to the B FBA blocks on DASD 16

GLOSSARY OF SELECTED TERMS

B—Number of FBA blocks involved in one CKD virtual track
BB—Block number of first FBA block to be staged into the current buffer. BBB The value BPB−CID but not BB
BBLAST—The FBA block number of the last block to be staged into the current buffer in on CKD staging operation.
BF—Flag related to block b indicating whether or not formatted
BPB—Number of bytes per FBA block
BPS—Number of bytes per sector in CKD data format
CB—Pointer to current byte being processed
CC—Cylinder number or address of CKD device being emulated
CCW—Channel command (control) word
CE—Channel End signal, indicates channel can be freed
CEDE—Channel End, Device End, indicates to channel operations completed
CF—Count field in CKD format record
CFP—Current field pointer
CFT—Current field type
CID—The number of bytes for the header in an FBA device
CKD—Count, key, data
CMD—Channel command
CYL—Number of cylinders in one CKD DASD
DE—Device end, signal to channel that device has completed operation
DF—Data field of CKD format record
DL—Length of data field DF, a field in count field CF
ECC—Error detection and correction redundancy
ECCC—Number of ECC bytes in count field CF
ECCD—Number of ECC bytes in data field DF
ECCH—Number of ECC bytes in HA
ECCK—Number of ECC bytes in key field KF
EOT—End of track, relates to index of physical DASD
FBA—Fixed Block Architecture
Gx—Gap length in bytes where x=1 through 3, CKD format
HH—Head or surface address of DASD (CKD or FBA)
HA—Home Address record of CKD format
HD—Header (control field) in FBA block for CKD emulation
KF—Key field of CKD format
NCP—Next count field pointer
NR—Next CKD record to be accessed
NRF—No record found meeting search criteria
NS—Need to seek bit or flag
PADC—Number of pad bytes in count field CF
PADD—Number of pad bytes in data field DF
PADH—Number of pad bytes in HA
PADK—Number of pad bytes in key field KF
PCP—Previous count field pointer
PDS—Partitioned data
PO—Previously oriented logically
PTR—Pointer used to point to field/item being processed
R—Record number, field is in count field CF
S—Sector number
SIZE—Size of field in bytes on CKD device being emulated (field identified following term)
T—Number of tracks in one cylinder of DASD
UC—Unit Check, a signal to the channel indicating an error
VTOC—Volume table of contents in DASD While the invention has been particularly shown and described with reference to preferred embodiments thereof, changes in form and details may be made therein without departing from the spirit and scope of the invention.

I claim:

1. A method of writing, on a recording disk formatted in fixed-block architecture (FBA) in fixed-length blocks, count-key-data (CKD)-formatted binary data records that are separated by interrecord gaps, comprising the steps of:

writing the CKD-formatted records into a buffer;
using an emulator, reorienting the records written into the buffer to create CKD-emulated records in FBA format by eliminating, from each CKD-formatted record before it is written to the disk, intrarecord gaps and bytes not essential for recreating the data in the respective CKD-emulated records in CKD format;
using the emulator, calculating the number and location of fixed-length blocks required to store each CKD-emulated record in a virtual track on the disk, where each virtual track consists of a predetermined number of fixed-length blocks at predetermined consecutive locations; and using the emulator, writing to the disk the CKD-emulated records from the buffer via an FBA adaptor in fixed-length blocks containing (i) header data indicating whether or not a CKD-emulated record begins in each such block, (ii) a number indicating byte displacement address, and (iii) padding bytes between each set of adjacent CKD-emulated records including bytes corresponding to the inter-record gaps to assure that the beginning of each respective CKD-emulated record has the same byte displacement from a reference location on a virtual track on the disk as each respective corresponding CKD-formatted record would have from an index on a physical track of a CKD-formatted disk so that each CKD-emulated record can be accessed in a single revolution of the FBA-formatted disk by use of its byte displacement from its reference location as an address, without requiring a special directory or map list.

2. The method of claim 1, including the step of:

providing between each of the block identification indicia containing physical track address and location on the disk of the block which follows said indicia.

3. The method of claim 1, including the step of:

providing a binary indicator identifying the end of the last emulated record on a virtual track.

4. The method of claim 3, including the step of:

moving the binary indicator progressively as additional emulated records are added for identifying a then current last emulated record.

5. The method of claim 1, including the step of:

transmitting the CKD data from a programmed processor without buffering to the emulator without the said not essential bytes, which not essential bytes would have been generated if the CKD data had been sent to a CKD controller for recording in a physical track on a CKD-formatted disk.

6. An apparatus for recording count key data (CKD)-formatted binary data records, comprising:

a recording disk formatted in fixed-block architecture (FBA) with fixed-length data blocks;

a buffer;

en emulator connected to the buffer for generating, from each CKD-formatted record and storing in the buffer, a CKD-emulated record in FBA format;

an FBA adaptor operatively connected to the emulator and the disk for transmitting CKD-emulated records from the buffer under the control of the emulator to the disk for recording thereon in virtual tracks, where each virtual track consists of a predetermined number of fixed-length blocks at predetermined consecutive locations; and said emulator being operative to (i) remove from each CKD-emulated record bytes not essential for recreating in CKD format the data of that respective CKD-formatted record, (ii) calculate the number and location of fixed-length blocks required to store each CKD-emulated record in a virtual track on the disk, (iii) provide, in each block, a number relating to byte displacement address and a binary indicator indicating whether a CKD-emulated record begins in such block, and (iv) provide, between adjacent CKD-emulated records, padding bytes in number sufficient to assure that the beginning of each respective CKD-emulated record has the same byte displacement from a single reference location in a virtual track on the FBA-formatted disk as each respective corresponding CKD-formatted record would have from an index if recorded on a physical track of a CKD-formatted disk.

* * * * *